March 31, 1953     J. O. WAGNER     2,633,140
DISHWASHING MACHINE
Filed July 22, 1947     2 SHEETS—SHEET 1
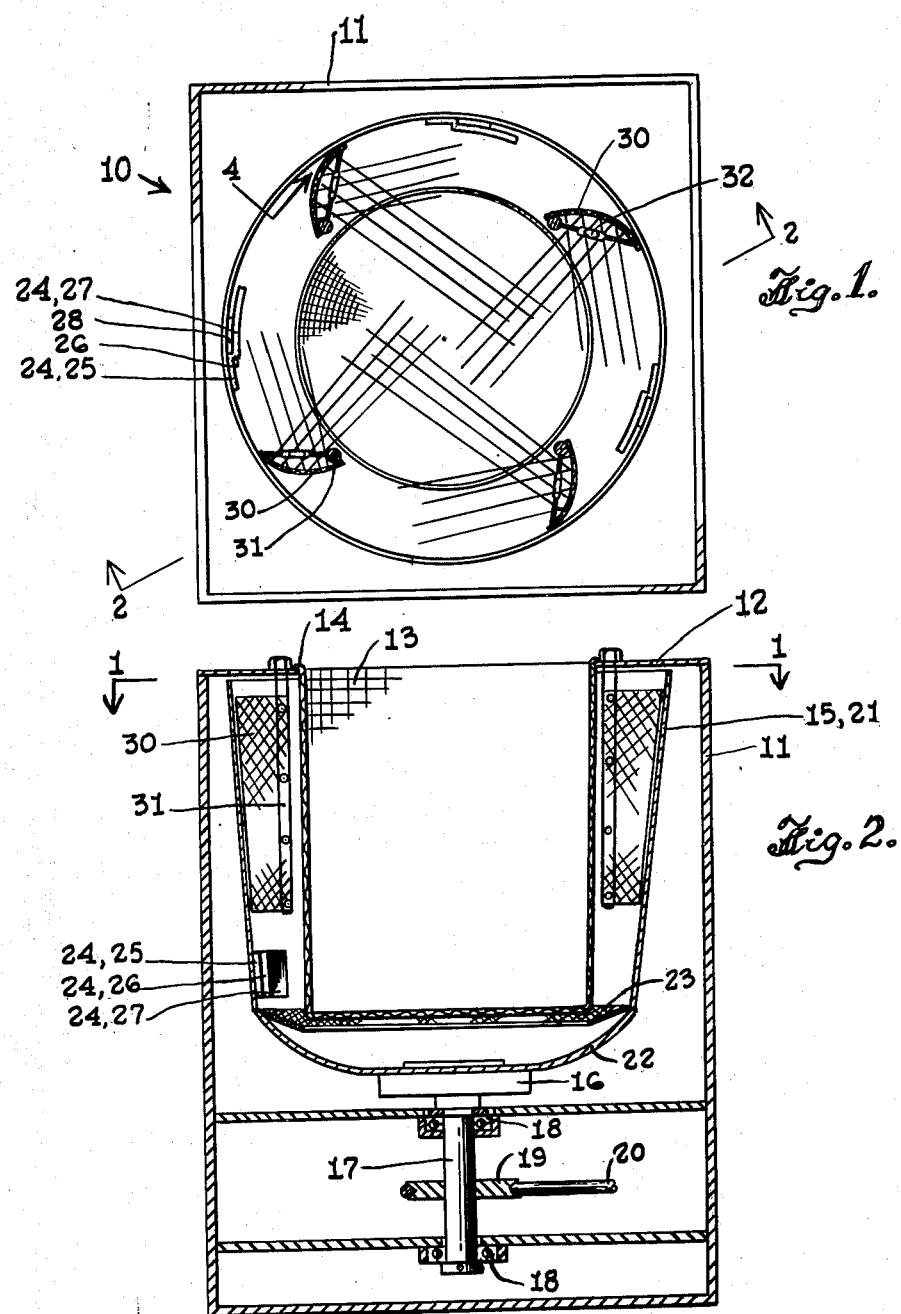
INVENTOR.
JOHN O. WAGNER.
BY
ATTORNEY.

INVENTOR.
JOHN O. WAGNER.
BY Nelson J. Edge
ATTORNEY

Patented Mar. 31, 1953

2,633,140

UNITED STATES PATENT OFFICE 2,633,140

DISHWASHING MACHINE

John O. Wagner, Palisade, N. J.

Application July 22, 1947, Serial No. 762,587

9 Claims. (Cl. 134—121)

The present invention refers to a dish washing machine and relates more specifically to a machine of the type comprising a casing interiorly of which is stationarily suspended a dish basket, and comprising means for circulating and re-circulating a comparatively small quantity of water through the dish basket to wash the dishes.

The principal object of the present invention is the provision of novel means for circulating water within the dish basket.

Another object is the provision of water circulating means which shall provide a flow of water within the basket from a multiplicity of points immediately adjacent thereto, the water flowing from said points in a multiplicity of vertical and horizontal angles to produce numerous streams which impinge on each other and then travel inward, all without the use of pipes or other complicated mechanisms.

Still another object is the provision of means for centrifugally elevating the water within the casing to the point from which it commences to flow inwardly of the basket.

Another and further object is the provision of novel strainer means by which dirt which is washed from the dishes is entrapped in the bottom of the apparatus and kept from recirculating, so that the water impinging on the dishes is always clean.

In accomplishing the objects of the present invention, a casing is provided with a central hole in the top thereof, and concentrically with said hole the dish basket is suspended stationarily from the casing. A pot is revolubly mounted in the casing and extends so as substantially to surround the dish basket. Means for revolving the pot, preferably in the form of an electric motor connected by a belt and pulley to the shaft of the pot, are mounted in the casing. The pot is of generally cylindrical construction, open at the top, and flaring outwardly from bottom to top. The bottom of the pot is generally of saucer shape. An annular strainer is concentrically mounted in the pot substantially at the junction of the bottom with the tapered cylindrical side wall. Elevator fins are mounted on the inner surface of the wall of the pot and inclined from the vertical backward upwardly relative to the direction of the rotation of the pot.

The pot is thus adapted to cause a relatively small amount of water placed in its bottom to mount up around the sides when the pot is rotated. Deflectors are mounted in the casing and extend downwardly between the basket and the pot in a substantially vertically extending, arcuate plane. The deflectors are supported on rods extending downward from the casing adjacent to the basket, and the plane of the deflector extends arcuately from its rod in the direction of rotation of the pot outwardly from the basket to a point of close proximity to the pot. The film of water centrifugally raised around the wall of the pot by rotation of the pot is concentrated by these deflectors into a relatively small space immediately in front of each deflector and in the acute angle formed between the deflector and the wall of the pot. The deflector comprises numerous foraminations. The deflector may either consist of a plate of perforated metal or of a sheet of expanded metal. The circularly traveling water, as it is crowded into the V between the wall of the pot and the deflector, passes through the deflector, the walls of the foraminations of the deflector changing the direction of travel of the water so that it proceeds inwardly of the basket to permeate the same. It has been found preferable to employ four such deflectors, and each deflector circulates water very completely through somewhat more than a quarter of the basket.

The walls of the foraminations, whether said foraminations consist of perforations in a perforated plate or the open portion of an expanded metal sheet, extend in a plurality of directions, so that the water concentrated between the deflector and the wall of the pot and directed against the walls of the foraminations, is caused to travel in many directions from the deflector. Water hitting a vertically extending wall will travel substantially horizontally inward, while water hitting a portion of the wall of the foramination which is inclined to the vertical will travel inwardly along an upward or downward path. Such diversity of directions of travel of the water results in convergence of the various streams of water so formed, so that the water is finally broken up into a multiplicity of inwardly traveling droplets, the path of each of which diverges from the other both vertically and horizontally, resulting in a very complete washing of both sides of all the dishes.

Other objects of this invention will in part be obvious and in part hereinafter pointed out. The invention accordingly consists in the features of construction, combinations of elements, and arrangements of parts which will be exemplified in the construction hereinafter described and of which the scope of application will be indicated in the following claims. In the accompanying drawing, in which is shown one of the various possible illustrative embodiments in this invention:

Figure 1 is a horizontal sectional view of a device embodying the present invention, taken on the line 1—1 of Figure 2.

Figure 2 is a vertical sectional view of the same taken on the line 2—2 of Figure 1.

Figure 3:
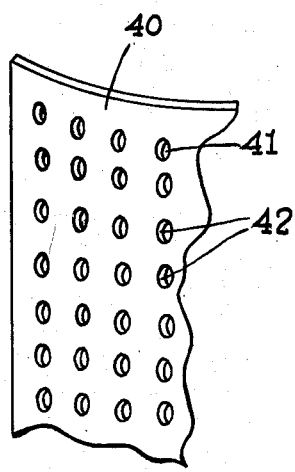
Figure 3 is a fragmentary perspective view of one form of the deflector.

Referring now in detail to the drawings, my improved dish washing machine 10 comprises a substantially rectangular outer casing 11, the latter comprising the top wall portion 12. Centrally mounted in top wall portion 12 is the substantially cylindrical, upwardly open dish basket 13 of open wire work or similar construction, basket 13 comprising a rim 14 by which it is suspended from top wall portion 12, extending downwardly into the casing 11. Basket 13 may be removed from casing 11 by lifting upwardly until basket 13 comes free of top wall 12.

A pot 15 is revolubly mounted in casing 11 so as to substantially concentrically surround basket 13, pot 15 extending from a point just below top wall portion 12 downward to a mounting plate 16 and being connected in conventional manner to a shaft 17 mounted in bearings 18 and mounting a pulley 19 driven by a belt 20, the latter engaging the pulley of an electric motor, the last mentioned pulley and motor not being shown.

Pot 15 comprises a wall portion 21 of tapered cylindrical form, being of larger diameter at the top and being open at the top. Pot 15 further has a substantially saucer shaped bottom portion 22. An annular strainer 23 is concentrically mounted in pot 15 substantially at the junction of wall portion 21 and bottom portion 22. A plurality of elevator fins 24, perferably three in number are equally spaced around wall portion 21 of pot 15 near the bottom thereof. The fins 24 are illustrated as comprising a sheet of metal or the like, the latter comprising a mounting portion 25 which is welded or otherwise firmly fastened to wall portion 21. Integral with portion 25 and extending perpendicularly to wall portion 21 of pot 15 is the intermediate portion 26 of fin 24. Integral with intermediate portion 26 and extending substantially parallel to wall portion 21, is the blade portion 27 of fin 24. The surface 28 connecting the inner surface of blade 27 to the inner surface of side wall 21 is inclined to the vertical, and its line of joinder to side wall 21 is likewise inclined to the vertical. The above construction of elevator fins 24 permits them to throw water up at comparatively low speeds of rotation of the pot, as blade portion 27 prevents escape of the water from the upward actuation of intermediate portion 26.

Figure 4:
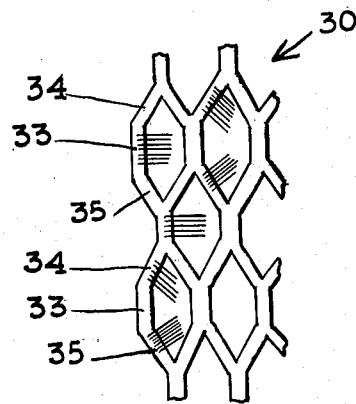
Figure 4 is a fragmentary enlarged elevation looking in the direction of the arrow 4 of Figure 1.
Figure 5:
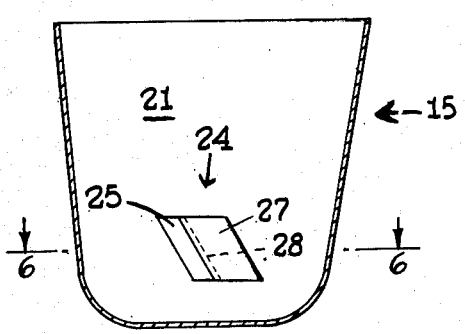
Figure 5 is an axial section of the pot, with certain parts omitted for the sake of clarity.
Figure 6:
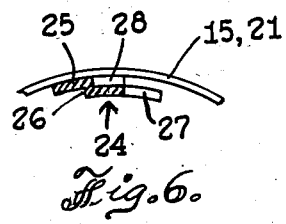
Figure 6 is a section on the line 6—6 of Figure 5.

Deflectors 30 are mounted on rods 31 extending downwardly from upper wall portion 12 adjacent to basket 13. The rod 31 extends substantially vertically, and deflectors 30 extend therefrom in a substantially vertical plane which further extends arcuately outward toward the wall 21 of pot 15, forming an acute angle therewith, as best seen in Figure 1. The arcuately extending body of deflectors 30 may consist of sheets of expanded metal, provided with hexagonal foraminations as illustrated in Figures 1, 2 and 4. Means for stiffening the body 30 and for regulating the curvature thereof are provided in the form of turnbuckles 32, connected at their inner ends to rod 31 and at their outer ends to the free end of deflector body 30.

Referring now to Figure 4, which is an orthographic elevational view on an enlarged scale looking in the direction of the arrow of Figure 1, it will be seen that the deflector body 30 comprises a plurality of walls defining the foraminations and comprising the surfaces 33, 34, 35, all extending substantially perpendicularly to the direction of the arrow 4, of Figure 1, the surfaces 33 further extending substantially vertically, the surfaces 34 facing downwardly, and the surfaces 35 facing upwardly.

In operation, basket 13 is filled with dishes and the saucer shaped bottom portion 22 of pot 15 is partially filled with water. Pot 15 is then caused to revolve clockwise of Figure 1. The water in the saucer shaped bottom portion 22 is thrown outward by centrifugal action, and passes upwardly through strainer 23. The water further mounts up the side 21 of pot 15, since the latter is tapered outwardly toward the top. The water is then caught by the elevator fins 24, and forced upwardly between wall 21, blade 27, and surface 28, being raised to the full height of pot 15. Deflectors 30 cause the water to be concentrated in the acute angle between deflectors 30 and the wall 21 of pot 15. The unusual feature of deflectors 30 is that they curve in the direction of rotation of pot 15 to cause its concentration of water against the pot wall in the relatively small space defined by the pot wall and the deflector. The concentrated water then is thrown against the surfaces 33, 34, 35 extending substantially perpendicularly to the direction of travel of the water, and the water is thus deflected inwardly of basket 13 and completely permeates the same. The water striking the surfaces 33 travels inwardly, following a substantially horizontal path. The water striking surfaces 34 also travels inwardly of basket 13, however it follows a downward path since surfaces 34 face downwardly. The water striking surfaces 35 also travels inwardly, but also upwardly, since surfaces 35 face upwardly. The water leaving each of the surfaces 33, 34, 35, at any given moment will be traveling in a particular direction and with a particular velocity, although the direction and velocity will both vary from moment to moment as the velocity and thickness of the water film striking these surfaces will vary due to the surging nature of the mass of water as it reaches the space between deflector 30 and wall 21. The variously directed streams of water converge on each other at various points inside and outside basket 13, and break into droplets which continue inwardly in an infinite variety of horizontal and vertical directions. The horizontal angle of travel of water as it leaves the surfaces 33, 34, 35 will vary with the velocity and thickness of the water film impinging on the surfaces and also with the angle at which said surfaces are disposed to wall 21, it being remembered that deflector body 30 extends in an arcuate plane and that while surfaces 33, 34, 35, being adjacent wall 21, are substantially perpendicular thereto, corresponding surfaces in body 30 further removed from wall 21 will extend at a different angle thereto than the surfaces 33, 34, 35. Each deflector 30 therefore throws its water over a substantial horizontal angle into basket 13, the angle illustrated in Figure 1 being diagrammatically represented as approximately 45 degrees, and four of such deflectors 30 being amply sufficient to completely permeate every part of basket 13, each deflector 30 being illustrated throwing water over approximately one quarter of basket 13 as viewed from above. The novelty of the deflectors 30 is therefore seen to further consist in the fact that in addition to their being curved in the direction of rotation of pot 15 they are of foraminate construction, and operate by impingement of the water concentrated between them and the wall 21 on the surfaces 33, 34, 35, the latter constituting walls of the foraminations of the body 30.

Referring now to Figure 3, an alternate form of deflector body 40 is illustrated. Body 40 comprises principally an arcuately extending plate of perforated metal. The perforations 41 permit the escape of water from the comparatively small space into which it has been concentrated between deflector body 40 and the wall 21 of pot 15. The cylindrical wall portion 42 of the perforations 41 comprise portions extending more or less perpendicularly to wall 21 and the direction of travel of the concentrated water, the various portions of the wall 42 further extending vertically and at various degrees of inclination to the vertical so that water impinging thereon is thrown partly horizontally inward and partly downwardly inward and partially upwardly inward of basket 13, similarly to the action more particularly described in connection with deflector body 30.

It will thus be seen that there is provided a device in which the several objects of this invention are achieved, and which is well adapted to meet the conditions of practical use. As various possible embodiments might be made of the above invention, and as various changes might be made in the embodiments above set forth, it is to be understood that all matter herein set forth or shown in the accompanying drawing is to be interpreted as illustrative and not in a limiting sense.

What is claimed is:

1. Water elevating means for a dish washing machine of the type comprising a casing, a dish basket supported therein, a pot open at the top and mounted in said casing for substantially concentric rotation around said basket, and means for dispersing water which has been elevated, said elevating means comprising a water elevating fin firmly connected to the side wall portion of said pot, said fin comprising a portion extending in a plane substantially perpendicular to said side wall portion, said fin further comprising a portion extending in a plane substantially parallel to said side wall portion and in spaced relation thereto.

2. Water dispersing means for a dish washing machine of the type comprising a casing, a dish basket supported therein, and a pot open at the top and mounted in said casing for substantially concentric rotation around said basket, said means comprising a water deflector sheet stationarily supported between said pot and said basket and extending outwardly toward said pot in the direction of rotation of said pot, said deflector sheet being formed with foraminations through which the water will pass and form a multiplicity of streams proceeding in a multiplicity of directions.

3. Water dispersing means according to claim 2, the walls of said foraminations extending substantially perpendicularly to the wall of said pot, and some of said walls further facing downwardly while other of said walls further face upwardly.

4. Water dispersing means according to claim 2, said water deflector sheet further extending in an arcuate plane.

5. Water dispersing means for a dish washing machine of the type comprising a casing, a dish basket supported therein, and a pot open at the top and mounted in said casing for substantially concentric rotation around said basket, said means comprising a plate stationarily supported between said pot and said basket inside said pot and extending outwardly toward said pot in the direction of rotation of said pot, said plate being formed with a multiplicity of cylindrical foraminations, the walls of said foraminations comprising portions facing substantially horizontally and further portions facing downwardly and further portions facing upwardly.

6. Water dispersing means for a dish washing machine of the type comprising a casing, a dish basket supported therein and a pot open at the top and mounted in said casing for substantially concentric rotation around said basket, said means comprising a rod extending fixedly and substantially vertically downward from said casing between said pot and said basket and a deflector sheet attached along one of its edges to said rod and extending in a substantially vertical, curved plane outwardly toward said pot and in the direction of rotation of said pot, said deflector sheet being free standing from said rod and the outer boundary of said sheet being in close proximity to said pot, said sheet further being formed with foraminations, some portions of the walls of said foraminations facing substantially horizontally, other portions of said walls facing downwardly and still other portions facing upwardly, and all of said portions of said walls closest to the inner surface of said pot extending substantially perpendicularly to said inner surface.

7. Liquid dispersing means comprising a pot open at the top and supported for rotation on a substantially vertical axis, and a plurality of stationarily supported deflector sheets extending downwardly into said pot adjacent the circumferential wall thereof and extending outwardly toward said wall and in the direction of rotation of said pot, said deflector sheets being formed with a plurality of foraminations, the walls of said foraminations comprising portions facing at substantial inclinations upwardly and downwardly, said deflector sheets further being located outside of a large empty central cavity of said pot, whereby liquid located around the inside surface of said pot during revolution thereof is forced through said foraminations in a multiplicity of converging streams and broken into droplets substantially throughout said central cavity.

8. Water dispersing means for a dish washing machine of the type comprising a casing, a dish basket supported therein, and a pot open at the top and mounted in said casing for substantially concentric rotation around said basket, said means comprising a plate stationarily supported and located outside said basket and inside said pot and extending outwardly toward said pot in the direction of rotation of said pot, said plate being formed with a multiplicity of hexagonal foraminations, the walls of said foraminations comprising portions facing substantially horizontally and further portions facing downwardly and further portions facing upwardly.

9. Liquid dispersing means comprising a pot open at one end and supported for rotation on a substantially fixed axis, and a plurality of stationarily supported deflector sheets extending into said pot adjacent the circumferential wall thereof and extending outwardly toward said wall and in the direction of rotation of said pot, said deflector sheets being formed with a plurality of foraminations, the walls of said foraminations comprising portions facing at substantial inclinations one to the other, said deflector sheets further being located outside of a large empty central cavity of said pot, whereby liquid located around the inside surface of said pot during revolution thereof is forced through said foraminations in a multiplicity of converging streams and broken into droplets substantially throughout said central cavity.

JOHN O. WAGNER.

REFERENCES CITED

The following references are of record in the file of this patent:

UNITED STATES PATENTS

| Number | Name | Date |
| --- | --- | --- |
| 786,459 | Nordlindh | Apr. 4, 1905 |
| 994,469 | Klick | June 6, 1911 |
| 1,358,507 | Berford | Nov. 9, 1920 |
| 1,583,236 | Murrish | May 4, 1926 |
| 1,632,007 | Kehoe | June 14, 1927 |
| 1,762,094 | Goetz | June 3, 1930 |
| 1,917,829 | Cole | July 11, 1933 |
| 1,960,816 | Kehoe | May 29, 1934 |
| 1,982,847 | Werner | Dec. 4, 1934 |

FOREIGN PATENTS

| Number | Country | Date |
| --- | --- | --- |
| 419,640 | France | Jan. 11, 1911 |